United States Patent [19]
Sandberg-Diment

[11] Patent Number: 5,826,245
[45] Date of Patent: Oct. 20, 1998

[54] PROVIDING VERIFICATION INFORMATION FOR A TRANSACTION

[76] Inventor: Erik Sandberg-Diment, 699 Pomfret Rd., Hampton, Conn. 06247

[21] Appl. No.: 407,503

[22] Filed: Mar. 20, 1995

[51] Int. Cl.⁶ .......................... H04M 17/00; H04M 11/00
[52] U.S. Cl. ............................... 705/44; 705/39; 705/40; 705/43
[58] Field of Search ................... 304/401 R, 406, 304/408; 380/25, 23, 33, 24, 49; 235/379, 380, 382, 382.5; 395/186, 187.01, 226, 235, 238, 239, 242, 244; 902/2, 27, 4, 5, 39, 40; 340/825.33, 825.34; 379/91

[56] References Cited

U.S. PATENT DOCUMENTS

| | | | |
|---|---|---|---|
| 4,023,013 | 5/1977 | Kinker | 235/379 |
| 4,123,747 | 10/1978 | Lancto et al. | 380/25 |
| 4,498,000 | 2/1985 | Decavele et al. | 235/380 |
| 4,679,236 | 7/1987 | Davies | 380/23 |
| 5,163,098 | 11/1992 | Duhbura | 380/24 |
| 5,279,737 | 1/1994 | Mical | 380/30 |
| 5,315,658 | 5/1994 | Micali | 380/30 |
| 5,436,972 | 7/1995 | Fischer | 380/25 |
| 5,485,510 | 1/1996 | Colbert | 379/145 |
| 5,517,569 | 5/1996 | Clark | 380/52 |
| 5,530,757 | 6/1996 | Krawczyk | 380/23 |

OTHER PUBLICATIONS

Gong; "Increasing Availability and Security of an Authentication Service"; *IEEE Journal on Selected Areas in Communications*; v11 n5; pp.657–662; Jun. 1993.

DeMaio; "My MIPS are Sealed"; *Chief Information Officer Journal*; v5 n7; pp. 46–50; Sep/Oct 1993; Dialog: File 15, Acc# 00761287..

Barlow; "A Plain Text on Crypto Policy"; *Communications of the ACM;* v36 n11; pp. 21–26; Nov 1993; Dialog File 15, Acc# 00781560.

*Primary Examiner*—Gail O. Hayes
*Assistant Examiner*—Stephen R. Tkacs
*Attorney, Agent, or Firm*—Fish & Richardson P.C.

[57] ABSTRACT

Verification information is provided with respect to a transaction between an initiating party and a verification-seeking party, the verification information being given by a third, verifying party, based on confidential information in the possession of the initiating party. On behalf of the initiating party, first and second tokens are generated, each of which represents some but not all of the confidential information. The first token is sent electronically via a nonsecure communication network from the initiating party to the verification-seeking party. The second token is sent electronically via a nonsecure communication network from the initiating party to the verifying party. Verification information is sent electronically via a nonsecure communication network from the verifying party to the verification-seeking party. The invention is useful, for example, in obtaining authorization of credit card transactions made via a nonsecure communication network, such as the INTERNET, while reducing the chance for credit card fraud.

24 Claims, 3 Drawing Sheets

PROVIDING VERIFICATION INFORMATION FOR A TRANSACTION

BACKGROUND

This invention relates to providing verification information for a transaction.

For example, as seen in FIG. 1, a consumer at a remote terminal 12 in a network 10 may electronically make a credit card purchase from a merchant 16 by entering a credit card number 25 and expiration date 27 of the credit card through a keyboard 24 or a swiping device 26 (which reads an encoded metallic stripe on the card) attached to the terminal 12. Alternatively, a "smart" credit card with a built-in programmable microchip may be read by a smart card reader 8. The credit card number and expiration date may be transmitted along with the consumer's purchase order 9 (which has also been entered into the terminal) over unsecure telephone lines 31 (via the switched public telephone network 33) between the terminal's modem 14 and the merchant's modem 18. At the merchant's end, a terminal 17 receives the information and stores it pending verification. The merchant verifies the purchase by electronically transmitting from terminal 17 via modem 18 and via the switched public telephone network 33 the credit card number 25 and the price of the order to a terminal 21 at the verification agent of the consumer's credit card company 20 via its modem 22. The merchant's terminal 17 receives back from the verification agent's terminal 21 an authorization code 36 which guarantees payment from the credit card company. The merchant then ships the goods.

SUMMARY

The invention provides a way to pass confidential information over an unsecured network with reduced risk of it being captured by an untrusted party.

Thus, in general, in one aspect, the invention features a method and apparatus for giving verification information with respect to a transaction between an initiating party and a verification-seeking party, the verification information being given by a third, verifying party, based on confidential information in the possession of the initiating party. On behalf of the initiating party, first and second tokens are generated, each of which represents some but not all of the confidential information. The first token is sent electronically via a nonsecure communication network from the initiating party to the verification-seeking party. The second token is sent electronically via a nonsecure communication network from the initiating party to the verifying party. The confidential information is verified at the verifying party based on the first and second tokens. Verification information is sent electronically via a nonsecure communication network from the verifying party to the verification-seeking party.

Implementations of the invention may include one or more of the following features. At least some of the confidential information may be stored at the verifying party. The verifying may be done by comparing the information represented by the first and second tokens with at least some of the stored confidential information. The tokens together may represent all of the confidential information. The tokens may include tags identifying the tokens as being related. The tags may be identical and may be randomly generated. The verifying may include associating the tokens with each other based on the tags. The tokens may include actual pieces of the confidential information, and an indication of the order that the two pieces occupy in the confidential information. The two tokens may be of essentially equal size. The tokens need not be sent from the initiating party one immediately after the other. The confidential information may include an identification number, e.g., a credit card number. The transaction may include a purchase, the initiating party may be a consumer, the verifying party may be a verification agent of a credit card company, and the verification-seeking party may be a merchant. Additional non-confidential information related to the transaction may be sent from the initiating party to the verification-seeking party. The additional information may include an expiration date of a credit card and a purchase order.

Advantages of the invention may include one or more of the following. The confidential information may be sent via non-secure communications links because the entire block of confidential information (e.g., the credit card number) is not available on any one link at a given time. It is only available as an entire block in the hands of the initiator (e.g., the credit card holder) and the verifying agent, and not to the verification-seeking party (e.g., a merchant).

Other advantages and features of the invention will become apparent from the following description and from the claims.

DESCRIPTION

Figure 1:
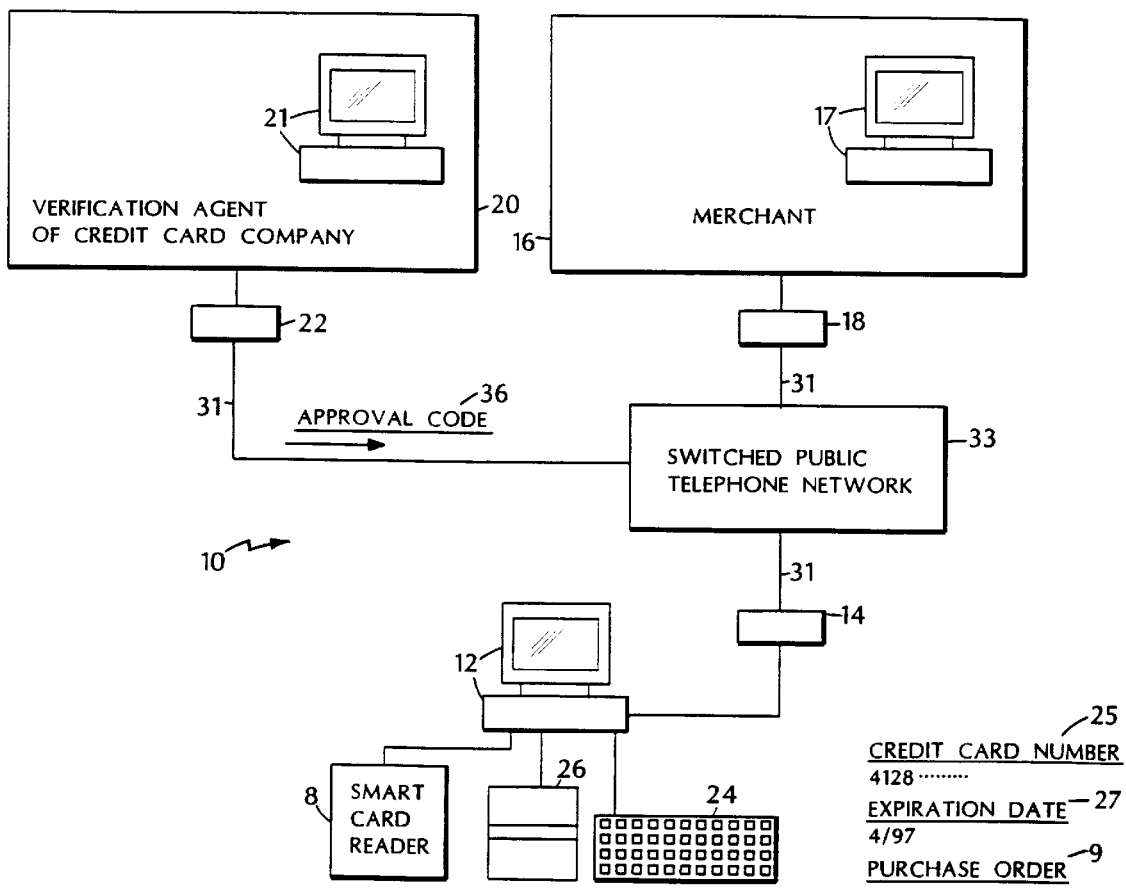
FIGS. 1 and 2 are block diagrams of terminals and a network.
Figure 2:
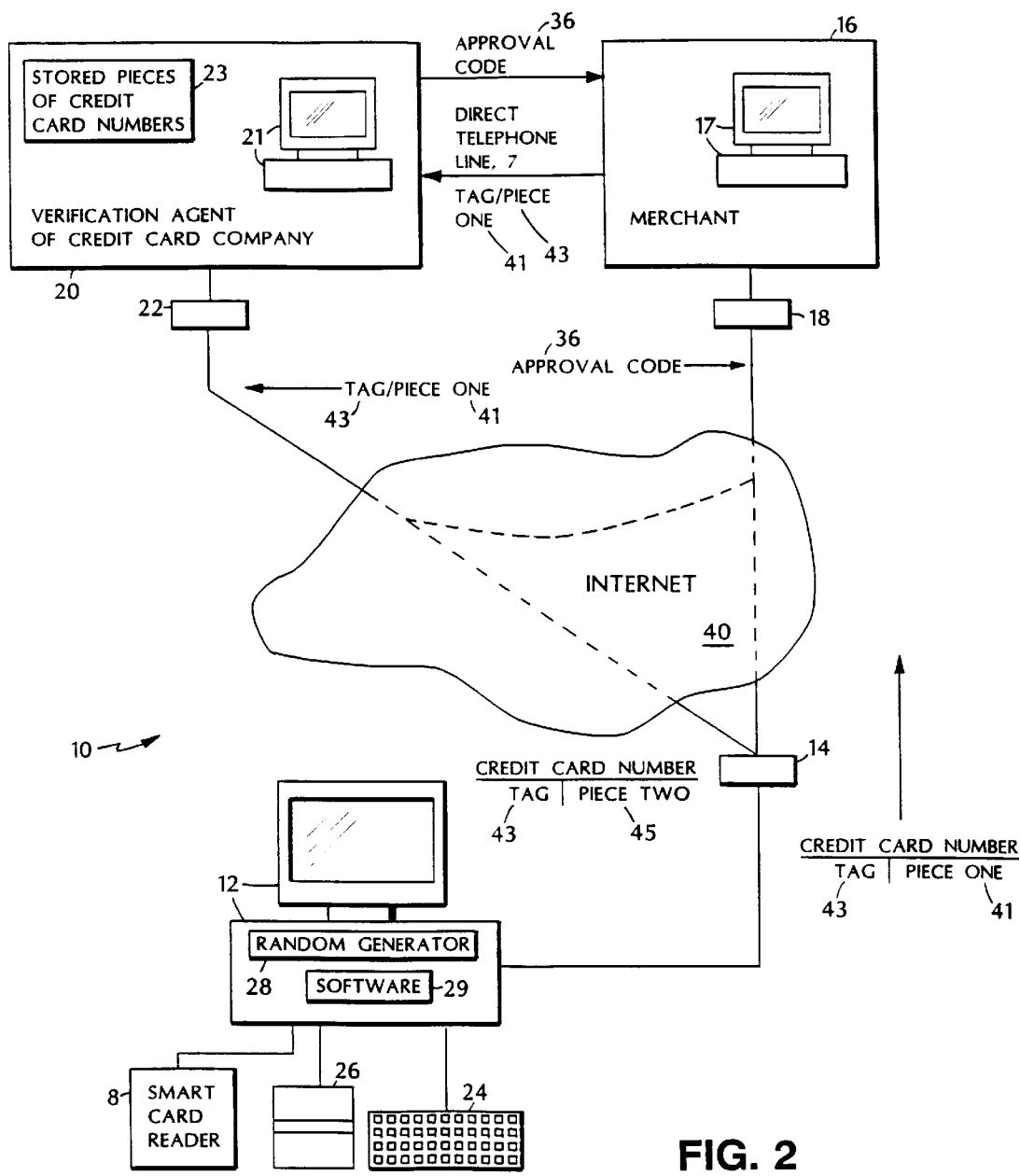

As seen in FIG. 2, to provide security in the transmission of a credit card number over an open network including, for example, the Internet 40, in connection with a purchase transaction, the credit card number may be split into two pieces. Only one piece 41 is sent to the merchant 16, and the other 45 is sent to the verification agent 20. An identification tag 43 is attached to each piece to permit later identification and reassembly of the credit card number by the verification agent 20. After the merchant 16 has received the consumer's order, the card expiration date, the tagged piece of the credit card number, and the price of the order are sent to the verification agent 20 via the Internet 40. The verification agent 20 combines the tagged pieces of the credit card number to reconstruct the number, checks the consumer's credit, and issues an approval code 36 to the merchant 16. In this process, only the customer and the verification agent 20 ever have possession of the complete credit card number.

Figure 3:
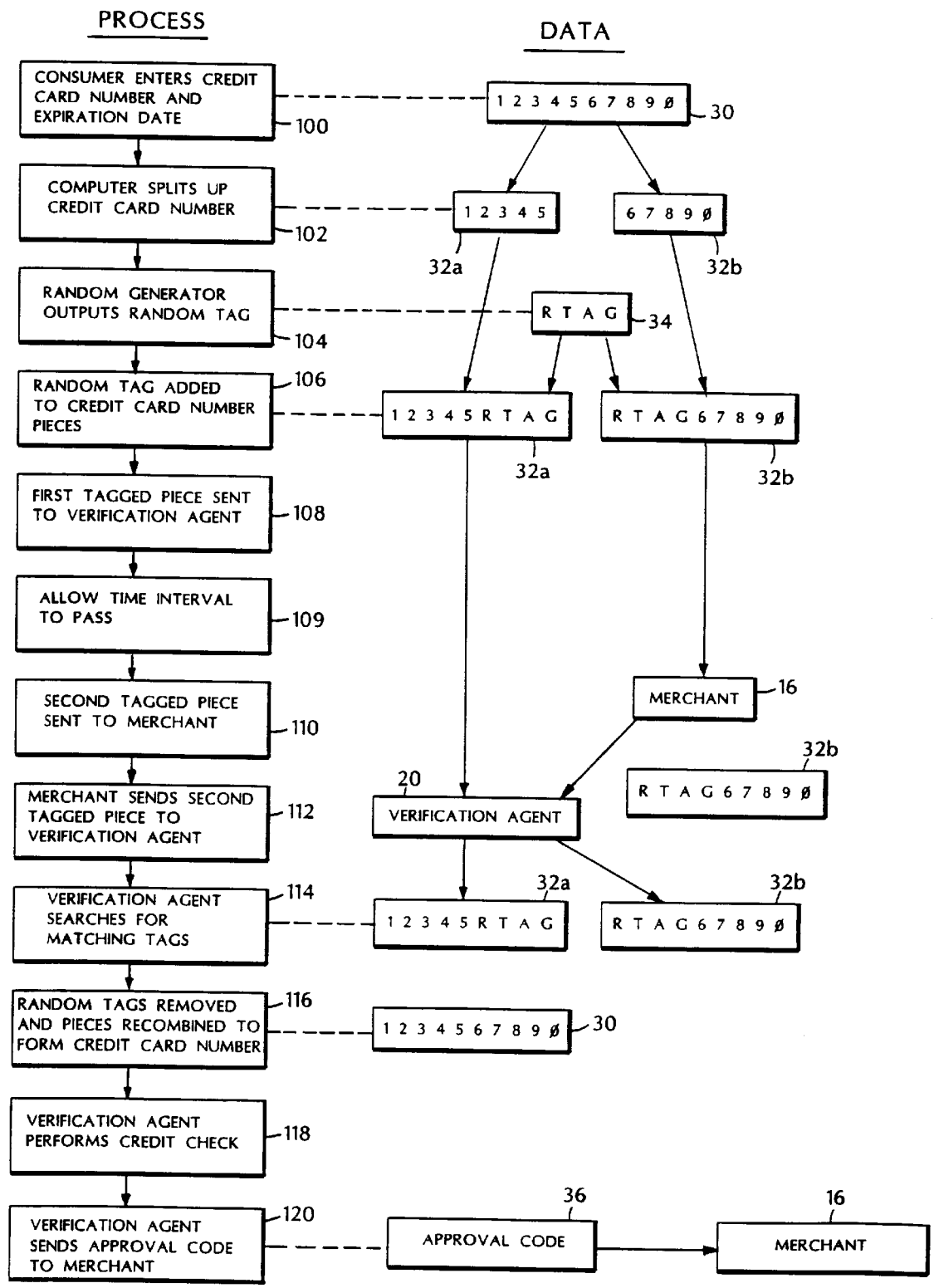
FIG. 3 is a flow diagram showing changes in data sent in a nonsecure communication network for a secured credit card transaction.

Referring also to FIG. 3, the process begins when the consumer enters his credit card number 30 (e.g., a ten digit string), the expiration date of the credit card, and a purchase order (step 100). Software 29 (FIG. 2) running on computer 12 splits the number 30 into the two pieces 32a and 32b, e.g., two pieces of equal length (each five digits) (step 102). The software 29 also stores the network addresses of the merchant 16 and the verification agent 20. Alternatively, a smart credit card with a microchip may contain the accessing software and information such as the relevant network addresses.

The software 29 includes a random number or character generator 28 which issues a four-digit pseudorandom tag 34 (step 104). The same tag 34 is added to both pieces 32a and 32b of the credit card number (step 106). The random tag 34 is attached to the end of one piece 32a and to the beginning of the other piece 32b, so that the verification agent 20 may easily tell which piece comes first in reconstructing credit card number 30.

The pseudorandom tag 34 may contain more than four digits. The tag 34 may be distinguished from the number by introducing an alphabetic character into the tag or by separating the shorter tag from the longer number by a string of zeros. Use of a pseudorandom tag 34 reduces the chance that someone monitoring the output of the computer 12 for the purpose of attempting to steal the credit card number 30 will be able to predict which tag will be used.

Computer 12 sends two separate packages of information via modem 14. One package holds the first tagged piece 32a and is sent directly to the verification agent 20 at its network address (step 108). The verification agent 20 receives the tagged piece 32a via its modem 22, and stores the tagged piece 32a for later recall.

The other package holds the second tagged piece 32b and is sent over the network (step 110) to the merchant 16 at its network address, along with the consumer's purchase order (including the consumer's name and address), credit card expiration date, and identification of the consumer's credit card company. The merchant's terminal may store the network address of the verification agent 20, or the address may be generated by computer 12 and sent to merchant 16 with the consumer's purchase order.

The two packages may be sent in either order. Allowing a time interval (of say 30 seconds) to pass between sending the two packages decreases the likelihood that both pieces 32a and 32b will be intercepted and recognized by their random tags (step 109).

Merchant 16 receives the tagged piece 32b and the other information at its modem 18 for storage and processing. The merchant 16 may prepare the consumer's order while waiting for an approval number from the verification agent 20. The merchant 16 does not know the consumer's entire credit card number 30, and for that and other reasons it must obtain approval from the verification agent 20 before it ships the consumer's order to ensure that it will receive payment. Accordingly, the merchant 16 sends piece 32b along with the price of the consumer's order from its modem 18 to the modem 22 of the verification agent 20 over the network 10 (step 112) or by direct telephone line 7 (FIG. 2) from the merchant 16 to the verification agent 20 outside the network 10.

The verification agent's terminal 21 compares the tag 34 of piece 32b to the tags of other pieces of credit card numbers 23 it has received over the network 10 (step 114). The tags in the pieces of credit card numbers received by the verification agent 20 are isolated by pattern recognition and matching or through a convention that the tag is always at the beginning or end of the number. When the tags 34 of two received pieces 32a and 32b are found to match, the verification agent 20 removes the tag from the end of piece 32a and the tag from the beginning of piece 32b and recombines the pieces in that sequence to obtain the consumer's credit card number 30 (step 116).

The verification agent 20 may then perform a credit check on the consumer's account (step 118). If the purchase is approved, the verification agent 20 sends an approval code 36 to the merchant 16 over the network 10 or by the direct telephone line 7 between the verification agent 20 and the merchant 16 (step 120). Later, the merchant 16 will present the transaction for payment, including the tagged piece 32b, the approval code 36, the price, and an identification of the goods. The credit card company will debit the consumer's credit card account for the price of that order and credit the merchant's account. If the purchase is not approved, the merchant 16 is so notified and will refuse the consumer's purchase order.

Using this procedure, the merchant 16 never receives the entire credit card number 30, but rather only a tagged piece 32b and an approval code 36 which need not bear any relation to the credit card number 30 itself. The credit card number 30 is never available as a whole except at the consumer's computer 12 and at the verification agent 20.

Other embodiments are within the scope of the following claims. The piece splitting may be used in other kinds of financial transactions. The technique could be used in a wide range of applications to protect confidential information. Also, more than three parties could be involved. More than three pieces could be used. The method could be used with any unsecured communication medium.

What is claimed is:

1. A method for giving verification information for a transaction between an initiating party and a verification-seeking party, the verification information being given by a third, verifying party, based on confidential information in the possession of the initiating party, the method comprising:

on behalf of the initiating party, generating first and second tokens each of which represents some but not all of the confidential information, sending the first token electronically via a nonsecure communication network from the initiating party to the verification-seeking party, sending the second token electronically via a nonsecure communication network from the initiating party to the verifying party, sending the first token electronically via a nonsecure communication network from the verification-seeking party to the verifying party, verifying the confidential information at the verifying party based on the first and second tokens, and sending the verification information electronically via a nonsecure communication network from the verifying party to the verification-seeking party.

2. The method of claim 1 further comprising storing, at the verifying party, at least some of the confidential information, and wherein the verifying is done at the verifying party by comparing the information represented by the first and second tokens with at least some of the stored confidential information.

3. The method of claim 1 wherein the first and second tokens together represent all of the confidential information.

4. The method of claim 1 wherein the first and second tokens include tags identifying the first and second tokens as being related.

5. The method of claim 4 wherein the tags in the two tokens are identical.

6. The method of claim 4 further comprising generating the tags randomly.

7. The method of claim 4 wherein the verifying comprises associating the first and second tokens with each other based on the tags.

8. The method of claim 1 wherein the tokens include pieces of the confidential information, and an indication of the order of the two pieces in the confidential information.

9. The method of claim 1 wherein the two tokens are of essentially equal size.

10. The method of claim 1 wherein the first token and the second token are not sent from the initiating party one immediately after the other.

11. The method of claim 1 wherein the confidential information comprises an identification number.

12. The method of claim 1 wherein the confidential information comprises a credit card number.

13. The method of claim 12 further comprising sending additional non-confidential information related to the transaction from the initiating party to the verification-seeking party.

14. The method of claim 13 wherein the additional information comprises an expiration date of a credit card.

15. The method of claim 13 wherein the additional information comprises a purchase order.

16. The method of claim 1 wherein the transaction comprises a purchase, the initiating party is a consumer, the verifying party is a verification agent of a credit card company, and the verification-seeking party is a merchant.

17. The method of claim 1 further comprising sending additional non-confidential information related to the transaction from the initiating party to the verification-seeking party.

18. The method of claim 17 wherein the additional information comprises an expiration date of a credit card.

19. The method of claim 17 wherein the additional information comprises a purchase order.

20. A method for enabling a consumer to conduct a credit card transaction with a merchant via an nonsecure communication medium comprising:

sending a first token electronically via the communication medium from the consumer to the merchant, the first token including a piece of a credit number of the consumer and a tag that identifies the first token, sending a second token electronically via the communication medium from the consumer to a verification agent, the second token including a piece of the consumer's credit number and a tag that identifies the second token, the pieces of the consumer's credit number together incorporating all of the credit number, the tags indicating an association of the two tokens with one another, storing the consumer's credit number at the verification agent, sending the first token electronically via the communication medium from the merchant to the verification agent, and at the verification agent:
associating the first and second tokens based on the tags,
deriving the credit number from the tokens, and
sending verification information from the verification agent to the merchant.

21. A method for giving verification information for a transaction between an initiating party and a responding party, the verification being given by a third, authorizing party, based on confidential information in the possession of the initiating party, the method comprising:

on behalf of the initiating party, generating first and second tokens each of which represents some but not all of the confidential information, sending the first token electronically via a nonsecure communication network from the initiating party to the responding party, sending the second token electronically via a nonsecure communication network from the initiating party to the authorizing party, sending the first token electronically via a nonsecure network from the responding party to the authorizing party, verifying the confidential information at the verifying party based on the first and second tokens, and sending the verification information electronically via a nonsecure communication network from the verifying party to the verification-seeking party.

22. A method for use in relation to providing verification information for a transaction between an initiating party and a verification-seeking party, the verification information being given by a third, verifying party, based on confidential information in the possession of the initiating party, the method comprising:

on behalf of the initiating party, generating first and second tokens each of which represents some but not all of the confidential information, on behalf of the initiating party, sending the first and second tokens electronically via a nonsecure communication network, collecting the first and second tokens at the verifying party, verifying the confidential information at the verifying party based on comparing the first and second tokens, and sending the verification information electronically via a nonsecure communication network from the verifying party to the verification-seeking party.

23. A method for providing a portion of confidential information from an initiating party to a receiving party comprising:

on behalf of the initiating party, generating first and second tokens each of which represents some but not all of the confidential information, sending the first token electronically via a nonsecure communication network from the initiating party to the receiving party, sending the second token electronically via a nonsecure communication network to a remote destination which is not related to the initiating party and the receiving party, sending the second token electronically via a nonsecure communication network from the remote destination to the receiving party, and recovering the confidential information at the receiving party based on comparing the first and second tokens.

24. A method for use in relation to providing verification information for a transaction, the verification information being based on confidential information, the method comprising:

on behalf of an initiating party, generating first and second tokens each of which represents some but not all of the confidential information, sending the first token electronically via a communication network from the initiating party to a verification-seeking party, sending the second token electronically via a communication network from the initiating party to a verifying party, and sending the verification information electronically via a communication network from the verifying party to the verification-seeking party.

* * * * *